F. R. BURCH.

MOTOR SLED.

APPLICATION FILED SEPT. 27, 1917.

Reissued Jan. 8, 1918.

14,418.

2 SHEETS—SHEET 1.

Witness

O. Johnson

By

Inventor

Frederick R. Burch

C. A. Hackins

Attorney

F. R. BURCH.

MOTOR SLED.

APPLICATION FILED SEPT. 27, 1917.

Reissued Jan. 8, 1918.

14,418.

2 SHEETS—SHEET 2.

Witness

C. Johnson

By

Inventor

Frederick R. Burch

C. D. Hackins

Attorney

UNITED STATES PATENT OFFICE.

FREDERICK R. BURCH, OF SEATTLE, WASHINGTON, ASSIGNOR OF NINE ONE-HUNDREDTHS TO JOE WEST AND NINE ONE-HUNDREDTHS TO EVA WEST, BOTH OF SEATTLE, WASHINGTON.

MOTOR-SLED.

14,418. Specification of Reissued Letters Patent. Reissued Jan. 8, 1918.

Original No. 1,228,093, dated May 29, 1917, Serial No. 111,097, filed July 24, 1916. Application for reissue filed September 27, 1917. Serial No. 193,606.

*To all whom it may concern:*

Be it known that I, FREDERICK R. BURCH, a citizen of the United States, residing in the city of Seattle, county of King, and State of Washington, have invented a certain new and useful Improvement in Motor-Sleds, of which the following is a specification.

My invention relates to improvements in motor sleds, and the object of my invention is to provide a motor vehicle which shall be adapted to propel itself over roads covered by snow and ice and to serve as a tractor for drawing after it other sleds that are not self propelling, and which shall be simple in its plan of construction and reliable in its operation.

A further object of my invention is to provide a motor sled whose several propelling members shall serve as its principal supporting runners and of which members those on each of opposite sides of said motor sled shall be adapted to oscillate in a vertical plane in response to its travel over uneven surfaces of roads, independently of oscillations of the like members on the opposite side of said sled.

I accomplish these and other objects by devices illustrated in the accompanying drawings wherein—

Figure 1:
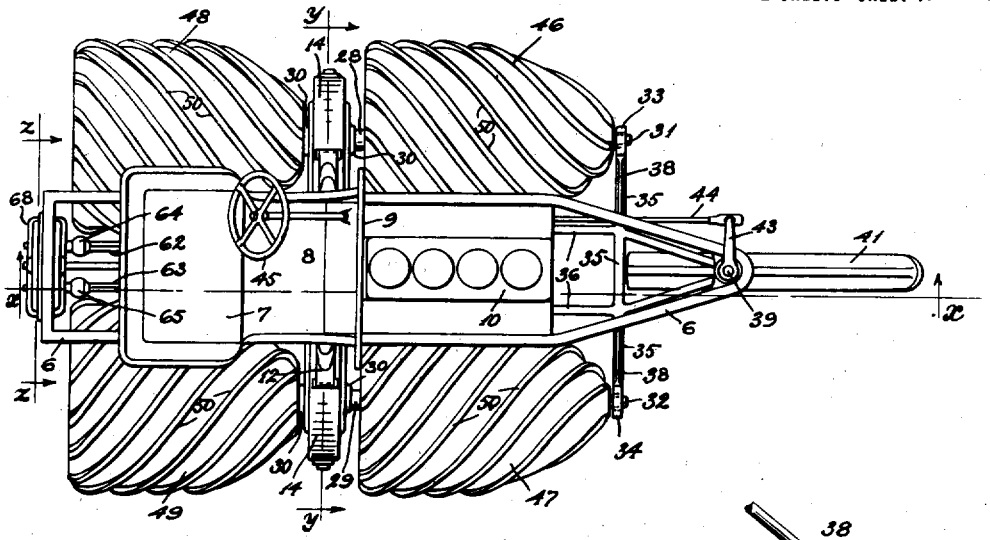
Figure 1 is a plan view of one form of a motor sled embodying my invention.
Figure 3:
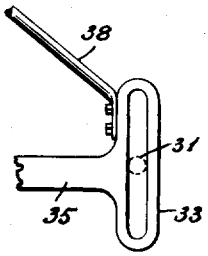
Fig. 3 is a fragmentary view, on an enlarged scale, in front elevation, of a detail of the same.

Referring to the drawings, throughout which like reference numerals designate like parts, a body-frame 6 is made of channel iron and upon said body-frame 6 is mounted an operator's seat 7, a floor 8, a dash-board 9, and an internal combustion engine 10.

The central portion of the body-frame 6 is provided with a rigidly attached cross beam 11 the under side of which rests upon the top half of an elliptical leaf carriage spring 12 to which it is fastened by U bolts 13 in a well known manner.

The bottom half of the carriage spring 13 rests upon a transversely disposed steel frame 14 to which it is fastened by U bolts 15.

Figure 4:
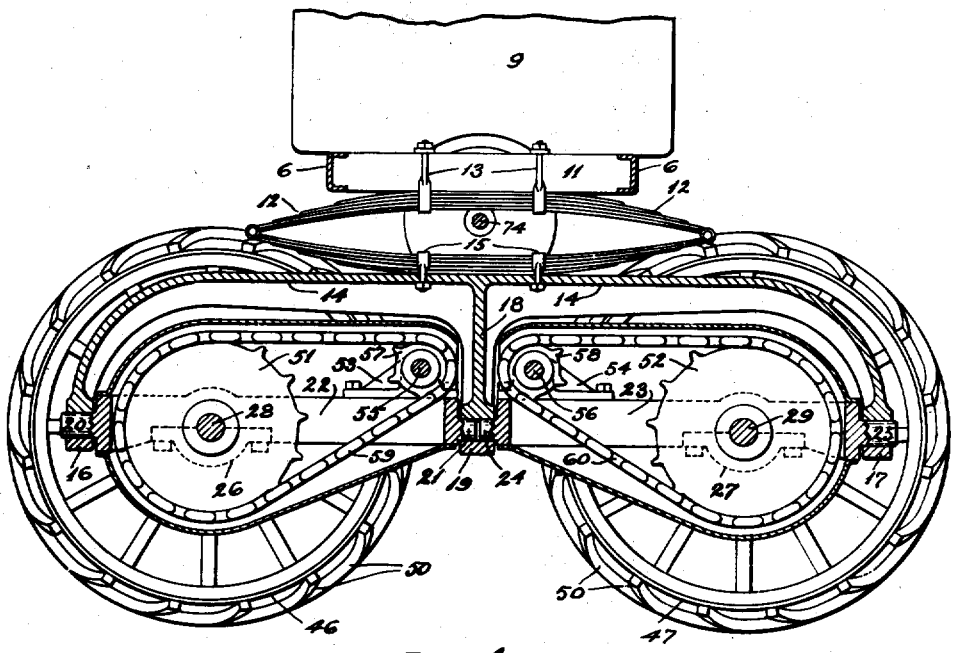
Fig. 4 is an enlarged view of the same in cross-section on broken line *y*, *y* of Fig. 1, with the floor and steering shaft removed.

Both of the opposite end portions of the steel frame 14 are curved downwardly to form an arc equal to a quadrant of a circle, and the lower part of each of said opposite end portions is provided with a journal bearing, as bearings 16 and 17, more clearly shown in Fig. 4, and extending downwardly from the central portion of said steel frame 14 is a lug 18 whose bottom end portion is provided with a journal bearing 19 that is in line with the bearings 16 and 17.

Disposed to be rotatably movable in the bearings 16 and 19 are journals 20 and 21 of a trunnion 22, which trunnion 22 extends between said bearings 16 and 19 with its journal 21 projecting nearly half way through said bearing 19; and, in a like manner, a similar trunnion 23 is disposed to extend between the bearing 17 and the bearing 19 with its journal 24 projected half way through said bearing 19 while its bearing 25 projects into the bearing 17, as more clearly shown in Fig. 4, whereby each of the trunnions 22 and 23 is adapted rotatively to move independently.

Figure 2:
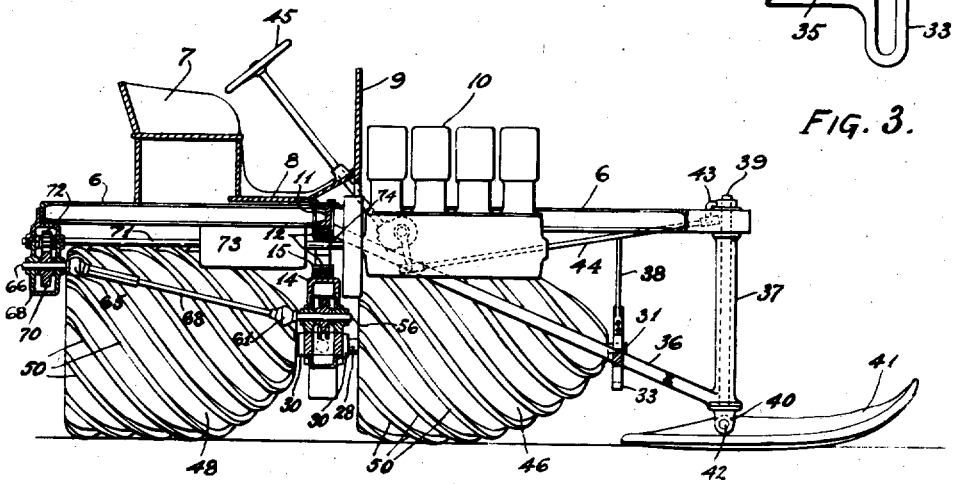
Fig. 2 is a view of the same in vertical section on broken line *x*, *x* of Fig. 1.

Each of the trunnions 22 and 23 consists of a rectangular frame which is provided with box-bearings, as box-bearings 26 and 27 indicated by dotted lines in Fig. 4, and within each of said box-bearings 26 and 27 is rotatively mounted a shaft, as shafts 28 and 29 respectively, which is disposed with its axis at right angles to the axis of its trunnion to project from each side thereof as shown in Figs. 1 and 2.

The shafts 28 and 29 are prevented from moving in lengthwise directions with respect to their respective trunnions 22 and 23 by means of collars 30 which engage with the sides of said trunnions, as shown in Figs. 1 and 2.

Those portions of the shafts 28 and 29 which project forward from their respective trunnions 22 and 23 terminate in the form of journals 31 and 32, respectively, which journals 31 and 32 are disposed in bearings 33 and 34, respectively, which consist of vertical slots formed in the opposite end portions of a cross-bar 35, whereby said shafts 28 and 29 shall be permitted to oscillate only in vertical planes and be guided in such movement by said bearings 33 and 34.

The cross-bar 35 is integral with a bifurcated brace-frame 36 whose rearward end portions are rigidly attached to the cross-beam 11 and which brace-frame 36 extends forwardly and obliquely downward from said cross-beam 11 to the lower end portion of a vertical tubular stud 37 with which it is integrally connected, the upper end of said stud 37 being rigidly attached to the forward end of the body-frame 6, as more clearly shown in Fig. 2.

Each of the opposite end portions of the cross-bar 35 is rigidly braced by an iron brace 38 one end of which is bolted to said cross-bar 35 while its other end is bolted to the body-frame 6.

The vertical tubular stud 37 serves as a bearing for a vertical shaft 39 which is disposed to be rotatable therein and which extends upwardly therethrough, the lower end portion of said shaft being provided with a bifurcated member 40 which is articulated to a sled runner 41 by a pivot 42 in the manner indicated more clearly in Fig. 2.

The bottom surface of the runner 41 is slightly curved in the direction of its length to adapt it more easily to be turned from a straight course in response to a rotative movement of the shaft 39, and such bottom surface is also curved in cross-section to cause it more readily to sink for a slight distance into the snow or ice to adapt it better to steer the vehicle in its course over an icy roadway.

The top end of the shaft 39 projects upwardly out of the top end of the vertical tubular stud 37 and to such top end is rigidly fastened an arm 43 that projects sidewise at a right angle with respect to the vertical plane of the runner 41 as shown more clearly in Fig. 1.

To the outer end of the arm 43 is articulated one end of a connecting rod 44 which is operatively associated with a steering wheel 45 whereby said arm 43 may be actuated in an obvious manner to turn the shaft 39 to cause the runner 41 to be turned in the direction of a desired course in its travel over the surface of a roadway or trail.

Rigidly mounted on the shafts 28 and 29 between their respective trunnions 22 and 23 and the cross-bar 35 are rotary tractors 46 and 47 respectively, and on those portions of said shafts 28 and 29 which project rearwardly from their respective trunnions 22 and 23 are rigidly mounted similar rotary tractors 48 and 49 respectively, each of which tractors 46, 47, 48 and 49 consists of a hollow metal cylinder whose forward end portion gradually decreases in its diameter to give it the form shown in Figs. 1 and 2, and each of said tractors 46, 47, 48 and 49 is provided with a plurality of spirally disposed fins, like fins 50, which extend therearound from one end to the other, said fins 50 of the tractors 46 and 48 being disposed to form right hand screw-threads while the fins 50 of the tractors 47 and 49 are disposed to form left hand screw-threads.

The tractors 46, 47, 48 and 49, as thus disposed serve to support nearly all of the weight of the body-frame 6 and of parts associated with said body-frame 6, and further serve to propel the motor sled in response to a rotation of the shafts 28 and 29.

Rigidly fastened on the shafts 28 and 29, between the side members of the trunnions 22 and 23, respectively, are sprocket wheels 51 and 52 respectively, and upon the top surface of the inner end of each of the trunnions 22 and 23 is fastened a bracket, as brackets 53 and 54 respectively, which is provided with a shaft bearing within which is rotatably disposed a shaft, as shafts 55 and 56, upon which is fastened a smaller sprocket wheel, as sprocket wheels 57 and 58 respectively.

Operatively mounted on the sprocket wheels 51 and 57 is a sprocket chain 59, and in a like manner mounted on sprocket wheels 52 and 58 is a sprocket chain 60, whereby rotary motion can be communicated from the shafts 55 and 56 to the rotary tractors 46, 47, 48 and 49.

The rearward ends of the shafts 55 and 56 are each connected by a universal joint, as joints 61 shown in Fig. 2, with one end of a shaft, as shafts 62 and 63 respectively, whose other end is connected by a similar universal joint, as joints 64 and 65 respectively, with a shaft, as shafts 66 and 67 respectively, which is journaled in bearings provided in a gear-box 68 that is attached to the rearward end of the body-frame 6.

Mounted on each of the shafts 66 and 67 within the gear-box 68 is a gearwheel, as gearwheels 69 and 70 respectively, the teeth of the gearwheel 69 being disposed to engage with the teeth of the gearwheel 70 whereby both of the shafts 66 and 67 will be adapted simultaneously to revolve, but in opposite directions.

Figure 5:
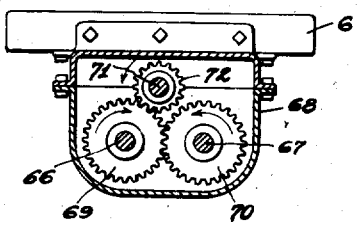
Fig. 5 is an enlarged view of parts of the same in cross-section on broken line *z*, *z* of Fig. 1.

Rotatably disposed in other bearings formed in the same gear-box 68 is one end of a shaft 71 and on said shaft 71 within said gear-box 68 is mounted a gearwheel 72 whose teeth operatively engage with the teeth of the gearwheel 69, as more clearly shown in Fig. 5.

The shaft 71 extends forward from the gear-box 68 to a power transmission mechanism not shown, which is disposed within a casing 73, which transmission mechanism is operatively connected with the engine 10 by a driving shaft 74 in a well known manner.

Manifestly, the fins 50 may be spirally disposed on the tractors 46, 47, 48 and 49 to form a propelling screw on any desired pitch to suit different conditions of service, and the engine 10 may be replaced by a different form of motor.

The operation of a motor sled embodying my invention in the manner illustrated and described will be obvious to those skilled in the art.

Of course changes may be made in the forms, dimensions and arrangement of parts of my invention without departing from the spirit thereof.

What I claim is:

1. A motor sled of the class described, which embodies four rotary tractors, each consisting of a cylinder having its forward end portion tapered and each provided with a plurality of propeller fins secured thereto to extend spirally therearound throughout its length; two shafts disposed with their axes in parallel vertical planes, and upon each of which shafts two of said tractors are rigidly mounted and disposed so that the front end of one of them shall be spaced from the rearward end of the other; two trunnions, each of which is provided with shaft bearings within which a different one of said two shafts is rotatably disposed, which bearings are disposed between the two tractors of said shaft; a sprocket wheel rigidly mounted on each of said two shafts in a position between the bearings thereof; a supporting frame within which said two trunnions are mounted to be independently rotatively movable with their axes in the same line, whereby said two shafts independently may oscillate in different vertical planes; another sprocket wheel rotatably mounted on each of said trunnions; a separate sprocket chain operatively disposed to communicate rotary motion from each of said other sprocket wheels to the sprocket wheel of a different one of said shafts; a body-frame mounted on said supporting frame to extend forwardly and rearwardly therefrom; a tubular stud rigidly attached to the forward end of said body-frame to extend downwardly therefrom; a vertical shaft disposed to extend through said tubular stud and adapted to be rotatively moved therein; a steering sled runner articulated to the lower end portion of said vertical shaft to adapt it to oscillate in a vertical plane; manually operative mechanism associated with said vertical shaft whereby said shaft may be rotatively moved to actuate said steering sled runner; a motor mounted on said body-frame; and controllable means for communicating rotary motion from said motor to the sprocket wheels mounted on said trunnions whereby said tractors may be rotated.

2. A motor sled of the class described, which embodies a supporting frame; two tractor shafts associated with said supporting frame to extend forwardly and rearwardly therefrom in positions parallel with each other and adapted each independently to oscillate in a different one of parallel vertical planes; two tractors rigidly mounted on each of said tractor shafts, each of said tractors comprising a cylinder provided with spirally disposed propelling fins; a body-frame resiliently mounted on said supporting frame; a steering runner operatively associated with a forward end portion of said body-frame; a motor mounted on said body-frame; a power shaft carried by the motor, stub-shafts operatively associated with the power shaft, a pair of driven shafts connected to the stub-shafts, a second pair of stub-shafts driven by the driven shafts, and operative connections between the last named stub-shafts and the tractor shafts.

3. A motor sled comprising a body portion, an inverted U-shaped frame carried thereby, a central rib depending from the frame, a pair of trunnions journaled in the sides of the frame and the rib, shafts journaled in said trunnions, tractors upon said shafts, a motor operatively associated with the tractor shafts, and steering means for the sled.

4. A motor sled comprising a body portion, a frame carried thereby and having spaced depending members, trunnions journaled therein, shafts journaled in said trunnions, tractors upon said shafts at opposite sides of the trunnions, stub-shafts journaled on said trunnions, chain and sprocket connections between the said shafts, motor mechanism associated with the stub-shafts, and steering means for the sled.

5. A motor sled of the class described, which embodies a transversely disposed supporting frame; two tractor shafts rotatably associated with said supporting frame and disposed to extend forwardly and rearwardly therefrom with their axes each in a different one of spaced parallel vertical planes and adapted each independently to oscillate in vertical directions; a body-frame mounted on said supporting frame; and a cross-bar each of whose two opposite end portions is provided with a vertical slot, said cross-bar being rigidly associated with said body-frame and disposed with the forward end portion of each of said tractor shafts extending freely through one of the vertical slots in said cross-bar whereby said tractor shafts shall be guided in their vertical movements and be maintained with their axes in said parallel planes.

In witness whereof, I hereunto subscribe my name this 3rd day of August, 1917.

FREDERICK R. BURCH.